US009282537B2

(12) United States Patent
Gerrish et al.

(10) Patent No.: US 9,282,537 B2
(45) Date of Patent: Mar. 8, 2016

(54) MASS NOTIFICATION SYSTEMS

(71) Applicants: Kevin Gerrish, Largo, FL (US); Ted Milburn, Bradenton, FL (US); Elliott Onstine, Bradenton, FL (US); Mark Bishop, Tampa, FL (US)

(72) Inventors: Kevin Gerrish, Largo, FL (US); Ted Milburn, Bradenton, FL (US); Elliott Onstine, Bradenton, FL (US); Mark Bishop, Tampa, FL (US)

(73) Assignee: Cooper Technologies Company, Houston, TX (US)

( * ) Notice: Subject to any disclaimer, the term of this patent is extended or adjusted under 35 U.S.C. 154(b) by 49 days.

(21) Appl. No.: 14/219,731

(22) Filed: Mar. 19, 2014

(65) Prior Publication Data

US 2015/0271781 A1 Sep. 24, 2015

(51) Int. Cl.
*H04W 68/02* (2009.01)
*H04W 4/22* (2009.01)
*H04L 12/18* (2006.01)

(52) U.S. Cl.
CPC ............ *H04W 68/02* (2013.01); *H04L 12/1895* (2013.01); *H04W 4/22* (2013.01)

(58) Field of Classification Search
None
See application file for complete search history.

(56) References Cited

U.S. PATENT DOCUMENTS

| 6,518,878 | B1 | 2/2003 | Skoff | |
|---|---|---|---|---|
| 8,350,694 | B1 | 1/2013 | Trundle et al. | |
| 2001/0043231 | A1* | 11/2001 | Abbott et al. | 345/700 |
| 2009/0201143 | A1 | 8/2009 | McKenna et al. | |
| 2012/0072844 | A1* | 3/2012 | Lefrancois des Courtis et al. | 715/736 |
| 2012/0286924 | A1 | 11/2012 | Goto | |
| 2013/0091213 | A1* | 4/2013 | Diab et al. | 709/204 |

OTHER PUBLICATIONS

International Search Report for PCT/US2015/020585, mailed Jun. 1, 2015.

* cited by examiner

*Primary Examiner* — Diane Mizrahi
(74) *Attorney, Agent, or Firm* — King & Spalding LLP

(57) ABSTRACT

A mass notification system is disclosed. The system can include a communication network. The system can also include a number of network devices communicably coupled to the communication network, where at least two of the network devices are configured to generate a communication substantially simultaneously. The system can further include a server communicably coupled to the communication network and configured to control the plurality of network devices, where the server instructs the at least two of the plurality of network devices to generate the communication. The system can also include a first client communicably coupled to the communication network and comprising a user interface, where the first client is configured to communicate, via the user interface, with the server and the plurality of network devices.

18 Claims, 7 Drawing Sheets

MASS NOTIFICATION SYSTEMS

TECHNICAL FIELD

Embodiments described herein relate generally to a communication system, and more particularly to systems, methods, and devices for mass notification systems.

BACKGROUND

Mass notification systems are designed to provide information to people at different locations at substantially the same time. A mass notification system can involve the use of audio and/or visual devices in communicating the information. The information can relate to an emergency (e.g., fire, tornado, hazardous spill) or a non-emergency situation. Some or all of the mass notification system can be located indoors and/or outdoors. A mass notification system can cover a particular geographic area (e.g., a building floor, entire building, a campus, a town) or a number of geographic areas (e.g., a number of towns within a county, a number of buildings owned by a company throughout the country).

SUMMARY

In general, in one aspect, the disclosure relates to a mass notification system. The mass notification system can include a communication network. The mass notification system can also include a number of network devices communicably coupled to the communication network, where at least two of the network devices are configured to generate a notification substantially simultaneously. The mass notification system can further include a server communicably coupled to the communication network and configured to control the network devices, where the server instructs the at least two of the network devices to generate a notification. The mass notification system can also include a first client communicably coupled to the communication network and having a user interface, where the first client is configured to communicate, via the user interface, with the server and the network devices.

In another aspect, the disclosure can generally relate to a mass notification system. The mass notification system can include a communication network. The mass notification system can also include a number of network devices communicably coupled to the communication network, where at least two of the network devices are configured to generate a notification substantially simultaneously, where the at least two of the network devices includes an audio device. The mass notification system can further include a server communicably coupled to the communication network and configured to control the network devices. The audio device can be a source of audio for a remainder of the at least two of the network devices. The source of audio generated by the audio device and delivered to the remainder of the at least two of the network devices overrides the server.

In another aspect, the disclosure can generally relate to a method for controlling a mass notification system. The method can include receiving a communication from a client communicably coupled to the mass notification system, wherein the mass notification system is controlled by a server. The method can also include transferring, in response to the communication, control of the notification system to the client. The mass notification system can include a number of network devices configured to generate a notification substantially simultaneously based on a subsequent communication from the client.

These and other aspects, objects, features, and embodiments will be apparent from the following description and the appended claims.

BRIEF DESCRIPTION OF THE DRAWINGS

The drawings illustrate only example embodiments of mass notification systems and are therefore not to be considered limiting of its scope, as mass notification systems may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
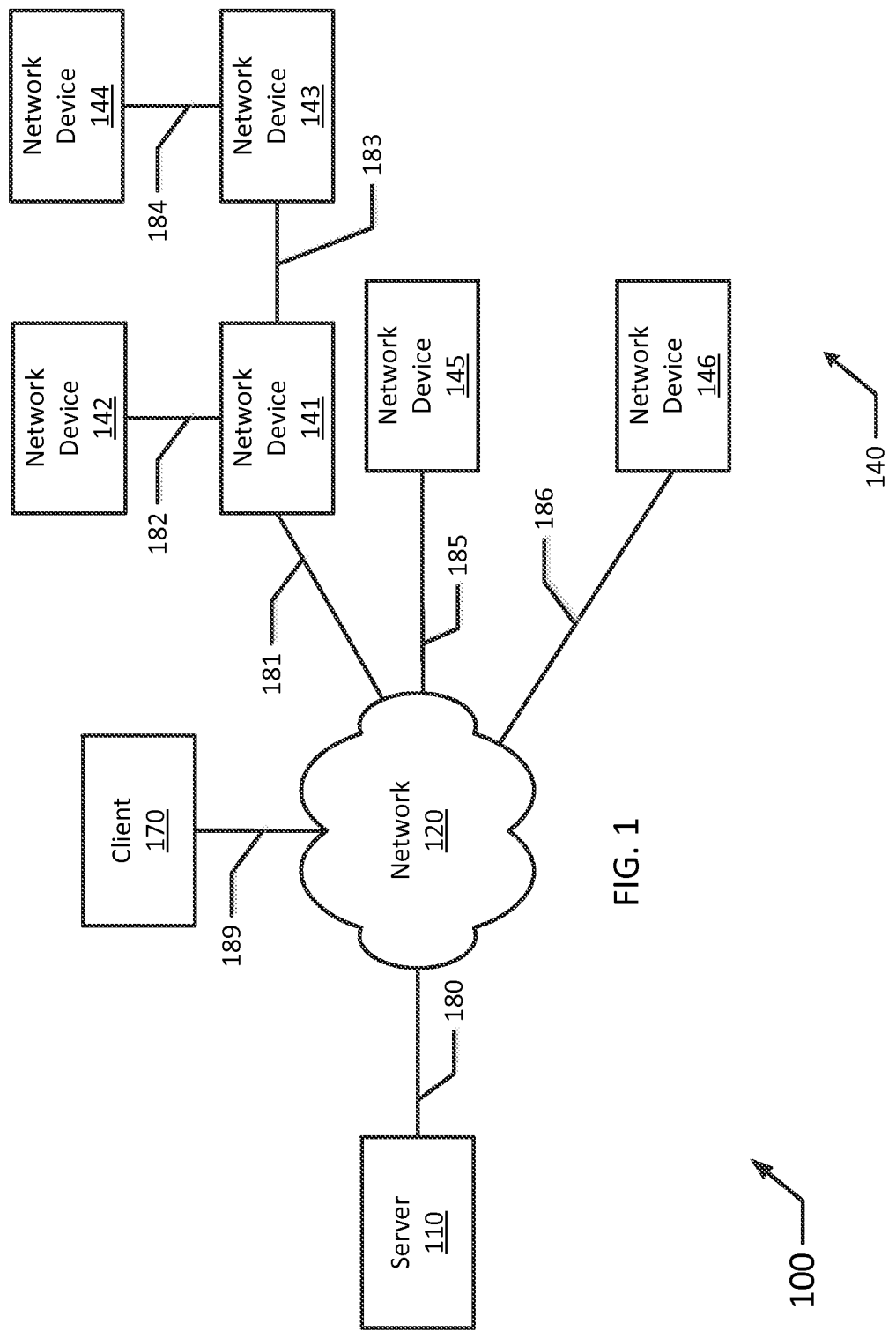
FIG. 1 shows a system diagram of a mass notification system in accordance with certain example embodiments.

The example embodiments discussed herein are directed to systems, apparatuses, and methods of mass notification systems. Mass notification systems as described herein can be used in one or more of a number of applications. Such applications can include, but are not limited to, mass notification, office work stations, fire alarm and protection, public address/general address, paging, emergency response, emergency preparedness, tornado warning, security, and surveillance. Thus, the examples of mass notification systems described herein are not limited to a particular application.

Any communications sent and received between one or more components (e.g., server, network device(s), client(s), audio device(s)) within a mass notification system described herein can use one or more of a number of communication protocols. Consequently, regardless of the communication protocol used, a communication sent by one component of the mass notification system can be addressed to one or more other specific components of the mass notification system. In other words, a communication generated and sent by a component of a mass communication system can be received and interpreted by the intended recipient component(s) of the mass communication system.

A mass notification system as described herein can be called one or more of a number of other names, including but not limited to a fire alarm system, a paging system, a public address/general address system, and a tornado warning system. Example embodiments can be used in one or more of a variety of environments, indoors or outdoors, where the light fixture can be mounted and exposed. Example environments can include, but are not limited to, conditions with moisture, humidity, dirt, exhaust fumes, vibrations, potential explosions, and noise.

Example embodiments of mass notification systems will be described more fully hereinafter with reference to the accompanying drawings, in which example embodiments of communicating with network devices are shown. Mass notification systems may, however, be embodied in many different forms and should not be construed as limited to the example embodiments set forth herein. Rather, these example embodiments are provided so that this disclosure will be thorough and complete, and will fully convey the scope of mass notification systems to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

FIG. 1 shows a system diagram of a mass notification system 100 in accordance with certain example embodiments. The mass notification system 100 of FIG. 1 can include a server 110, one or more network devices 140 (e.g., network device 141, network device 142, network device 143, network device 144, network device 145, network device 146), at least one communication channel (e.g., communication channel 180, communication channel 181, communication channel 182, communication channel 183, communication channel 184, communication channel 185, communication channel 186, communication channel 189), a network 120, and a client 170.

Those skilled in the art will appreciate that a number of configurations of a mass notification system can be used, and that the configuration of the mass notification system 100 of FIG. 1 is only one example. The server 110 is communicably coupled to each of the network devices 140 and the client 170. The various communication channels and the network 120 can collectively be called a communication network. Each point (wireless or hardwired) on the communication network where a device (e.g., a network device 140, a client 170, a server 110) are communicably coupled can be called a node.

The server 110 can be any type of device capable of generating, sending, receiving, and interpreting communications. The communications generated and sent by the server 110 are sent to one or more of the network devices 140 and/or the client 170. The communications sent by the server 110 can be sent through one or more communication channels (e.g., communication channel 180) to the network 120, and then from the network 120 through one or more communication channels (e.g., communication channel 181, communication channel 189) to one or more of the network devices 140 and/or the client 170. For example, in this case, communication channel 185 allows communications to be sent between the network 120 and network device 145. As another example, communication channel 181 allows communications to be sent between the network 120 and network device 141. As a further example, communication channel 189 allows communications to be sent between the network 120 and the client 170.

In certain example embodiments, a communication generated and sent by the server 110 instructs two or more network devices 140 to generate and/or output a notification. If a network device 140 is generating a notification, the communication can include details of the content of the notification. A communication sent by the server 110 to two or more network devices 140 can instruct those network devices 140 to output a notification at substantially the same time. For example, the server 110 can instruct a number of speakers (network devices 140) to output a certain alarm noise substantially simultaneously to indicate that a fire has been detected. A communication generated and sent by the server 110 can also instruct two or more network devices 140 to stop generating and/or outputting a notification.

In some cases, one or more communication channels and/or networks can be operably between two or more network devices 140. For example, as shown in FIG. 1, communication channel 183 can allow communications to be sent between network device 141 and network device 143. As another example, communication channel 182 can allow communications to be sent between network device 141 and network device 142. As yet another example, communication channel 184 can allow communications to be sent between network device 144 and network device 143.

Similarly, one or more of the network devices 140 can generate and send communications to the server 110 using the same communication channels. The network devices 140 can be any type of device capable of receiving and interpreting communications from the server 110. In addition, a network device 140 can generate a response based on a communication received from the server 110 and send such response (another communication) through the network and communication channel(s) to the server 110. In certain example embodiments, one or more of the network devices 140 is an audio device, as described below with respect to FIG. 2.

In certain example embodiments, a network device 140 can generate and/or output a notification. Such a notification can be based on the configuration of the network device 140. For example, a network device 140 that is a speaker can give a notification in the form of sound (audio). In such a case, the sound can vary depending on the reason for the notification. For example, the sound can be a noise indicating a fire. As another example, the sound can be a different noise indicating a tornado. As another example, the sounds can be yet another noise indicating that there is no longer a threat of danger. Examples of a network device 140 can include, but is not limited to, a fire alarm, a fire alarm control panel (FACP), a desktop computer, an alarm panel, a loudspeaker, a radio, an egress light, a speaker, a printer, a fax machine, a copier, and a mobile device. A network device 140 can be called by one or more of a number of other names. For example, a network device 140 can be called an Internet protocol communicator or an IP communicator.

The communication channels described herein use wired and/or wireless technology. The network 120 can include one or more systems and/or devices for routing communications between the network devices 140, the client 170, and the server 110 through the appropriate communication channels. The network 120 can use or include the Internet, an intranet, an Ethernet, and/or some other system of digital communication. The network 120 can use wired and/or wireless technology. The network 120 can be configured so that one or more network devices 140, the client 170, and/or the server 110 can be added, removed, and/or otherwise altered to change the mass notification system 100.

The network 120 can use one or more Internet protocols or other communication protocols for routing the various communications throughout the mass notification system 100. Examples of a communication protocol used for a communication generated and sent by the server 110 to a particular network device 140 and/or the client 170 can include a transmission control protocol/Internet protocol (TCP/IP) address or connection and a multi-cast network protocol. In some cases, the network 120 can be bypassed so that there is a direct connection between the server 110 and a network device 140 and/or the client 170.

In certain example embodiments, the client 170 is a device that has read-only access to the server 110, one or more network devices 140, and/or any other part of the mass notification system 100. Alternatively, the client 170 can control some or all of the mass notification system 100, overriding the server 110 in the control of such portions of the mass notification system 100. As another alternative, the client 170 can control the server 110 as well as one or more of the network devices 140. The client 170 can have a user interface (e.g., a graphical user interface (GUI)) to allow a user (defined below) to generate commands, generate reports, monitor a real-time status of a network device 140, control a network device 140, and/or otherwise interact with some or all of the mass notification system 100.

A mass notification system 100 can include more than one client 170. Each client 170 can be permanently or detachably communicably coupled to the communication network of the mass notification system 100. A client 170 that is detachably coupled to the communication network of the mass notification system 100 can communicably couple to the communication network at one or more nodes. In such a case, the client 170 can be portable. The client 170 can also be portable while communicably coupled to a single node of the communication network of the mass notification system 100, as when the coupling node uses wireless technology. If a client 170 can be communicably coupled to multiple nodes of the communication network of the mass notification system 100, the client 170 can be communicably coupled to one node at one point in time, and the client 170 can be communicably coupled to another node of the communication network of the mass notification system 100 at another point in time.

If there are multiple clients 170, and if two or more of those clients 170 are attempting to perform a conflicting function (e.g., turn on/off a network device 170), either with each other or with the server 110, the conflict can be resolved using one or more of a number conflict resolution protocols (e.g., logic rules). Such conflict resolution protocols can be based on one or more of a number of factors, including but not limited to the time order of events, a priority (e.g., based on user login) established by a certain client 170, and the function of the network device 140 that is the subject of the conflict. More information about the client 170 is discussed below with respect to FIG. 3.

In certain example embodiments, a communication generated and sent by the client 170 instructs two or more network devices 140 to generate and/or output a notification. If a network device 140 is generating a notification, the communication can include details of the content of the notification. A communication sent by the client 170 to two or more network devices 140 can instruct those network devices 140 to output a notification at substantially the same time. For example, the client 170 can instruct a number of speakers (network devices 140) to output a certain alarm noise substantially simultaneously to indicate that a fire has been detected. A communication generated and sent by the client 170 can also instruct two or more network devices 140 to stop generating and/or outputting a notification.

The server 110 can control, in the absence of the client 170 when the client 170 is in some form of control, all network devices 140 within the mass notification system 100 using the communication network. Typically, the server 110 is a computer system (a general example of which is described below with respect to FIG. 7) that controls the network devices 140 based on one or more of a number factors, including but not limited to software instructions or other logic steps, a user command, default instructions, passage of time, the occurrence of an event (e.g., detection of a fire), and/or some other factor.

In certain example embodiments, the server 110 detects the client 170 when the client 170 is communicably coupled to the communication network of the mass notification system 100. The server 110 can detect the client 170 automatically, based on a communication sent by the client 170 and received by the server 110, based on the occurrence of an event, and/or based on some other event. When the server 110 detects the client 170, the server 110 can allow the client 170 to have an amount of access and/or control over some or all of the network devices 140 in the mass notification system 100. In such a case, the amount of access can include, but is not limited to, read-only access, complete control, conditional control (e.g., control is granted to the client 170 by the server 110 if one or more certain conditions are satisfied), fixed duration control (e.g., control is granted to the client 170 by the server 110 for a specific period of time), and variable duration control (e.g., control is granted to the client 170 by the server 110 for a period of time that is based on the satisfaction of one or more conditions).

Figure 2:
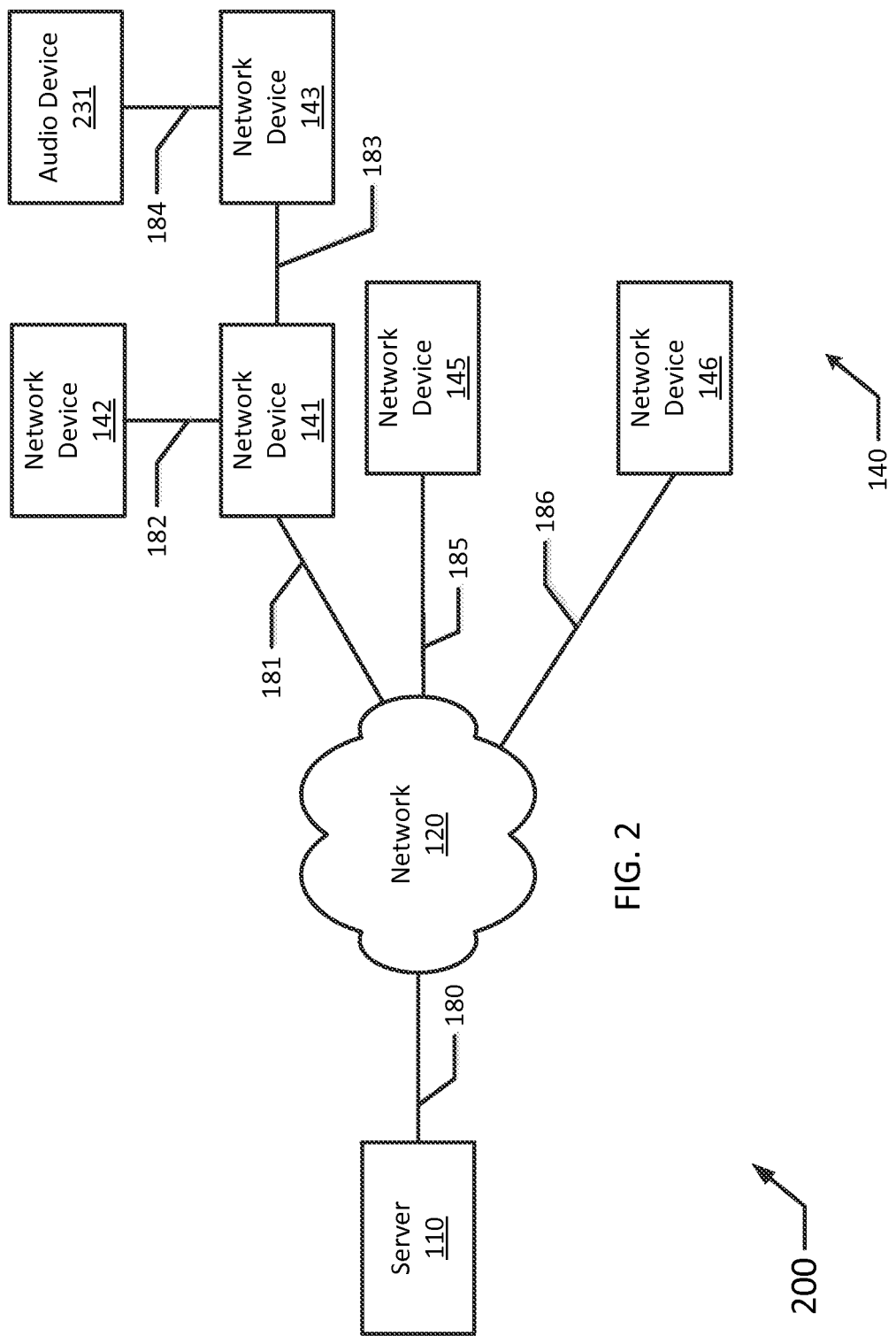
FIG. 2 shows a system diagram of another mass notification system in accordance with certain example embodiments.

FIG. 2 shows a system diagram of another mass notification system 200 in accordance with certain example embodiments. In one or more embodiments, one or more of the components shown in FIG. 2 may be omitted, added, repeated, and/or substituted. Accordingly, embodiments of mass notification systems should not be considered limited to the specific arrangements of components shown in FIG. 2. The mass notification system 200 of FIG. 2 can be substantially similar to the mass notification system 100 of FIG. 1, except as described below. For example, the server 110, the communication network, and one or more of the network devices 140 can be substantially the same between the mass notification system 100 of FIG. 1 and the mass notification system 200 of FIG. 2. In the mass notification system 200 of FIG. 2, the client (substantially similar to the client 170 of FIG. 1) can be omitted. Alternatively, one or more clients can be included in the mass notification system 200.

In certain example embodiments, the mass notification system 200 of FIG. 2 includes one or more audio devices (e.g., audio device 231). An audio device can be, or be part of, a network device 140. An audio device can be a source of audio for at least one network device 140 in the mass notification system 200. For example, for the mass notification system 200 shown in FIG. 2, the audio device 231 can be a source of audio for network device 142 and network device 146. In order for the audio device 231 to provide audio to a network device 140, the audio device 231 can be communicably coupled to the communication network of the mass notification system 200. Specifically, the audio device 231 can be communicably coupled to one or more nodes of the communication network. When the audio device 231 is communicably coupled to the communication network, the audio device 231 can override the server 110.

As with the client 170 described above with respect to FIG. 1, an audio device 231 can be fixedly or detachably coupled to the communication network of the mass notification system 200 using one or more nodes. In either case, the audio device 231 can be portable. For example, the audio device 231 can be communicably coupled to one node at one point in time, and the audio device 231 can be communicably coupled to another node of the communication network of the mass notification system 200 at another point in time. The audio device 231 can be communicably coupled to a node using wired and/or wireless technology. In the example of FIG. 1, the audio device 231 is communicably coupled to the communication network at communication channel 184.

In certain example embodiments, a communication generated and sent by the audio device 231 instructs two or more network devices 140 to generate and/or output a notification. If a network device 140 is generating a notification, the communication can include details of the content of the notification. A communication sent by the audio device 231 to two or more network devices 140 can instruct those network devices 140 to output a notification at substantially the same time. For example, the audio device 231 can instruct a number of speakers (network devices 140) to output a certain alarm noise substantially simultaneously to indicate that a fire has been detected. A communication generated and sent by the audio device 231 can also instruct two or more network devices 140 to stop generating and/or outputting a notification. More information about the audio device 231 is discussed below with respect to FIG. 4.

The server 110, a client 170, an audio device 231, and/or a network device 140 can send communications (e.g., commands, requests for information, broadcast data or information) to one or more other components of a mass notification system. Such communications serve one or more of a number of purposes. For example, a communication can change the state of one or more network devices 140, receive the status of one or more network devices 140, repeat a command to change the status of one or more network devices 140, or perform some other function. In certain example embodiments, the server 110 in a mass notification system (e.g., mass notification system 100, mass notification system 200) can be a network device in a larger mass notification system.

Figure 3:
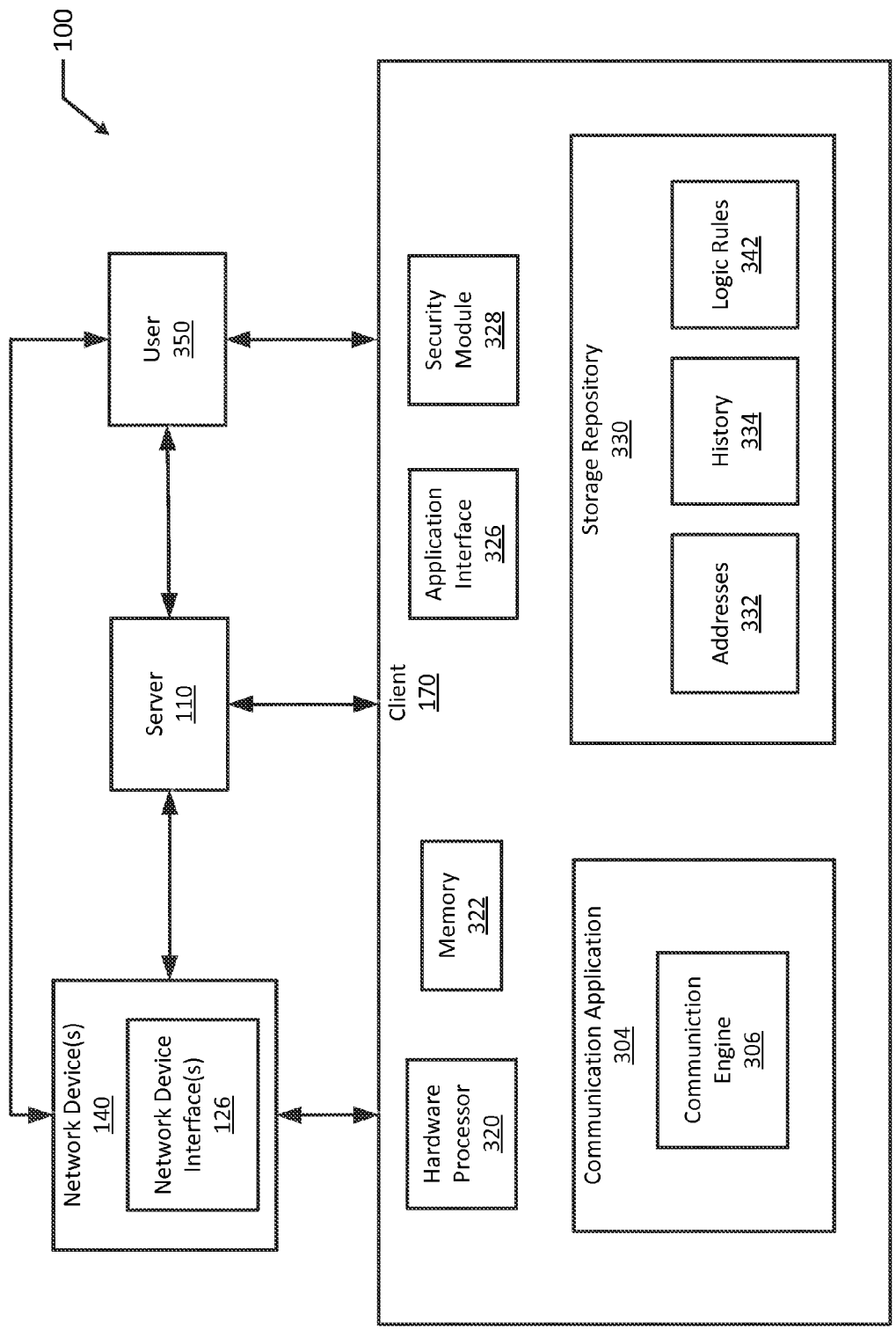
FIG. 3 shows a diagram of the mass notification system of FIG. 1 in accordance with one or more example embodiments.

FIG. 3 shows a diagram of the mass notification system 100 of FIG. 1 in accordance with one or more example embodiments. The mass notification system 100 can be part of the mass notification system (e.g., mass notification system 100) described above with respect to FIG. 1. The mass notification system 100 can include the server 110, one or more network devices 140, a user 350, and a client 170. The client 170 can include a communication application 304, a storage repository 330, a hardware processor 320, a memory 322, an application interface 326, and, optionally, a security module 328. The communication application 304 can include a communication engine 306. The storage repository 330 can include addresses 332, history 334, and logic rules 342. The one or more network devices 140 can include a network device interface 126.

Each of these components is described in further detail below. Example embodiments are not limited to the configuration shown in FIG. 3 and discussed herein. Additionally, although certain components have been enumerated as being part of the mass notification system 100, it is understood that some components are combined with other components and/or some components are further divided into additional components in other alternative example embodiments.

In one or more example embodiments, the client 170 is implemented according to a client-server topology. The client 170 may correspond to enterprise software running on one or more servers, and in some embodiments may be implemented as a peer-to-peer system, or resident upon a single computing system. In addition, the client 170 may be accessible from other machines using one or more network device interfaces 126, server interfaces, and/or user interfaces. In one or more example embodiments, the client 170 may be accessible over a network (e.g., network 120), such as the Internet, by the server 110 and/or one or more users 350. Further, information and/or services provided by the client 170 may also be stored and accessed over the network.

Alternatively or additionally, in one or more example embodiments, the client 170 is a local computer system of the user 350. In such embodiments, the client 170 is, optionally, not implemented using a client-server topology. For example, client 170 can correspond to a laptop computer, desktop computer, mobile device, another type of computing device, or a combination of multiple computing devices. Additionally or alternatively, the client 170 can be a distributed computer system and/or a multi-processor computer system in which the computer system includes multiple distinct computing devices.

Continuing with FIG. 3, a user 350 as described herein may be any person that is involved with the removal, installation, operation, and/or maintenance of a mass notification system and/or devices (e.g., network device 140, client 170) within a mass notification system. Examples of a user may include, but are not limited to, a company representative, an electrician, an engineer, a mechanic, an operator (local or remote), a consultant, a contractor, and a manufacturer's representative. A user 350 can interact with a mass notification system or any portion thereof directly or remotely.

The user 350 uses one or more applications to communicate with the client 170, the server 110, and/or one or more network devices 140 in accordance with one or more example embodiments. For example, the user 350 can receive a notification from the client 170 as to the operation or lack of operation of a particular network device 140. According to some example embodiments, the user 350 sends information (e.g., user preferences, settings, data) to the client 170, the server 110, and/or the network devices 140 in a number of manners (e.g., modes of communication), including but not limited to a direct input, over the Internet, some other suitable mode for sending information, or any combination thereof.

In certain example embodiments, the information sent by the user 350 to the client 170, the server 110, and/or the network devices 140 is delivered automatically (e.g., according to a default setting, a consumer preference, an occurrence of an event) or on demand, for example, in response to a notice from the client 170, the server 110, and/or a network device 140. The client 170, the server 110, and/or the network devices 140 interact with the user 350 in the same manner that the user 350 interacts with the client 170, the server 110, and/or the network devices 140, or in a different manner using different modes of communication. The user 350 can use a user system (not shown), which is discussed below in further detail, to interact with the client 170, the server, and/or the network devices 140 using software (not shown) in accordance with one or more example embodiments.

In one or more example embodiments, each network device 140, using a network device interface 126, sends communications (e.g., responses, information) to, and receives communications (e.g., a request for information, a command) from, the client 170. The communications can be delivered automatically (e.g., according to a default setting, a marketing entity preference, an occurrence of an event) or on demand, as from a request made by the client 170. The communications provided by the network devices 140 can include, but are not limited to, the status of the network device 140, an acknowledgment of receipt of a communication from the client 170, and a change in the status of the network device 140.

Each network device 140, using a network device interface 126, can interact with the client 170 in the same mode of communication that the client 170 interacts with the network device 140 or using different modes of communication in alternative example embodiments. In one or more example embodiments, each network device 140 uses a system (not shown) to interact with the client 170 using the network device interface 126 and network device software, which is discussed in further detail below. The client 170 also can be implemented as a browser extension according to some example embodiments. In such a scenario, user software and/or network device software interacts directly with the client 170 as a browser extension.

In addition to sending and receiving communications, the network device interface 126 of each network device 140 can interpret a communication sent by the client 170. The network device interface 126 of each network device 140 can also generate a response and/or other form of communication that is sent to the client 170. Such a response and/or other form of communication can include content (e.g., addresses 332) to identify the network device 140 and the client 170.

The network device interface 126 of a network device 140 mass notification system 100 can also determine which communication channel(s) and/or which protocol to use in sending a communication to the client 170. In some cases, the network device interface 126 of a network device 140 can choose one or more communication channel(s) and/or a protocol based on the corresponding communication received from the client 170.

Continuing with FIG. 3, the client 170 can interact with the user 350, the server 110, and/or each network device 140 using an application interface 326 in accordance with one or more example embodiments. Specifically, the application interface 326 of the client 170 receives input (communications) from and sends output (communications) to the user 350, the server 110, and/or each network device 140. The user 350, the server 110, and/or each network device 140 can include an interface to receive communications from and send communications to the client 170 in certain example embodiments. Examples of this interface include, but are not limited to, a graphical user interface, an application programming interface, a keyboard, a monitor, a mouse, a web service, a data protocol adapter, some other hardware and/or software, or any suitable combination thereof.

In one or more embodiments of the invention, the communications received by the application interface 326 can include, but is not limited to, state of operation, user preferences, commands, settings, and feedback. The communications sent by the application interface 326 can include, but is not limited to, a request for status of a network device 140, device communication from the server 110, a command to change the status of a network device 140, and a request for additional information. The communication sent by the application interface 326 can specify, but is not limited to, a user 350, the server 110, one or more network devices 140, a Uniform Resource Identifier (URI) (e.g., a Uniform Resource Locator (URL), a web address, etc.), information generated by and/or requested by the communication engine 306, some other software or source of information, or any suitable combination thereof.

In one or more example embodiments, the communications transferred among the application interface 326, the user 350, server 110, and/or each network device 140 corresponds to metadata associated with such information. In this case, the metadata describes the data specified (i.e., the metadata provides context for the specified data). In one or more example embodiments, the client 170, the server 110, and/or one or more network devices 140 supports various data formats provided by the user 350 and/or one or more other network devices 140.

Continuing with FIG. 3, the client 170 retrieves and stores addresses 332, history 334, and logic rules 342. More specifically, the client 170 uses the communication engine 306 to retrieve and store addresses 332, history 334, and logic rules 342 in the storage repository 330 in accordance with one or more example embodiments.

In one or more example embodiments, an address 332 is a unique identifier (sometimes called a target address) for a network device 140, another client 170, and/or the server 110. The addresses 332 of the storage repository 330 can include the address of some or all of the network devices 140 in the mass notification system 100. An address can also be the unique identifier of the client 170. Each address is fixed in certain example embodiments, or is adjusted based on a logic rule, user input, and/or any other information that can affect or alter an address.

In one or more example embodiments, the history 334 of the storage repository 330 is based on previous communications sent and/or received by the client 170. Some or all history 334 can be stored in the storage repository 330. For example, only the previous 24 hours of communications may be stored in the history 334 of the storage repository 330. The history can be associated with a time. Time in this case can be a clock time, an interval of time, or some other measure of time. Thus, when history 334 is stored in the storage repository 330, the history 334 can be associated with a network device 140 (based, for example, on the addresses 332) and/or with a particular time. In this way, the client 170 can measure the current state of one or more network devices 140 and/or the server 110, and/or whether the one or more network devices 140 and/or the server 110 has changed state compared to a communication with a network device 140 and/or the server 110 at some prior point in time.

In one or more example embodiments, the logic rules 342 of the storage repository 330 are a set of deterministic steps that the client 170, the server 110, and/or one or more network devices 140 must follow under certain circumstances. Specifically, the logic rules 342 represent how the client 170, server 110, user 350, and network devices 140 interact with each other based on certain conditions and/or circumstances. The logic rules 342 can include allowances, prohibitions, and/or priorities. The logic rules 342 can allow certain network devices 140 to be controlled by the client 170 instead of the server 110. Some or all of the logic rules 342 can be fixed according to some example embodiments, while in other example embodiments, one or more logic rules 342 can vary based on one or more of a number of factors, including but not limited to user input, operational history, passage of time, connectivity of the client 170 to the communication network, and function of the network device 140.

Continuing with FIGS. 1-3, the storage repository 330 can be a persistent storage device (or set of devices) that stores software and data used to assist the communication engine 306 in communicating with the network devices 140 within the mass notification system 100. In one or more example embodiments, the storage repository 330 stores the addresses 332, history 334, and logic rules 342. Examples of a storage repository 330 include, but are not limited to, a database (or a number of databases), a file system, a hard drive, some other form of data storage, or any suitable combination thereof. The storage repository 330 is located on multiple physical machines, each storing all or a portion of the addresses 332, history 334, and logic rules 342 according to some example embodiments. Each storage unit or device can be physically located in the same or different geographic location.

The storage repository 330 can be operatively connected to the communication application 304. In one or more example embodiments, the communication application 304 includes functionality to communicate with the network devices 140 in the mass notification system 100. More specifically, the communication application 304 sends information to and/or receives information from the storage repository 330 in order to communicate with the network devices 140, the server 110, and/or the user 350.

The functions of the communication application 304 can be performed on a single computing device or on multiple computing devices (for example, on different network devices 140). When the functions of the communication application 304 are performed on multiple computing devices, a number of configurations and/or frameworks are used in certain example embodiments. The configurations and/or software frameworks are designed to work with multiple data nodes and large quantities of data. One or more calculations performed by one or more components of the communication application 304 are performed on multiple machines operating in parallel, where the results from each machine is combined to generate a result to the one or more calculations.

Each component of the communication application 304 described herein (specifically, the communication engine 306) uses addresses 332, history 334, and/or logic rules 342 to generate and send a communication to the network devices 140, the server 110, and/or the user 350. In one or more example embodiments, the communication engine 306 of the communication application 304 coordinates the storage repository 330 and, optionally, the security module 328. Specifically, the communication engine 306 coordinates the transfer of information between the application interface 326 and the storage repository 330 according to certain example embodiments.

Further, the communication engine 306 also retrieves the addresses 332, history 334, and the logic rules 342 from, and sends the addresses 332, history 334, and the logic rules 342 to the storage repository 330 for use by the communication engine 306. The communication engine 306 can also retrieve the addresses 332, history 334, and/or the logic rules 342 from the storage repository 330 to be sent to the server 110 and/or the user 350.

In certain example embodiments, the communication engine 306 generates one or more communications for, and send one or more communications to, the server 110 and/or one or more network devices 140. The communication engine 306 can generate and send communications continuously, at regular intervals, upon the occurrence of some event (e.g., a change in status of a network device 140, a communication received from a user 350), and/or randomly. The communication engine 306 can generate any type of communication for one or more network devices 140, the server 110, and/or a user 350. Examples of such types of communication can include, but are not limited to, an instruction (e.g., to change state, to perform an operation, to allow the client 170 to control certain network devices 140), a request for information (e.g., current status of a network device 140), and report of status of the network devices 140.

The type of communication generated by the communication engine 306 can be based on logic rules 342, an instruction from the user 350, an instruction from the server 110, and/or some other factor. Similarly, the particular network devices 140 that are the intended recipients of a communication generated by the communication engine 306 can be determined by the communication engine 306, logic rules 342, the user 350, and/or some other factor. In any case, the addresses 332 of the intended recipients are provided to the communication engine 306 by the storage repository 330. Once received, the communication engine 306 incorporates the addresses 332 into the communication generated by the communication engine 306.

When the communication generated by the communication engine 306 is complete, the communication engine 306 sends the communication through the various communication channels and the network 120 of the communication network. In certain example embodiments, the communication is broadcast by the communication engine 306 throughout the mass notification system 100 so that the server 110 and all network devices 140 receive the communication. Alternatively, a request can also be sent to the server 110 and/or one or more specific network devices 140 (e.g., the intended recipients) according to some example embodiments. Any communication sent and/or received by the communication engine 306 can be executed using the application interface 326. Each communication uses the proper communication protocol, as determined by the communication engine 306.

In addition, when the communication engine 306 receives one or more communications from the server 110, a user 350, and/or one or more of the network devices 140, the communication engine 306 can determine the content of such communications. In some cases, the communication engine 306 generates a communication based on a communication received from the server 110, a user 350, and/or a network device 140. In certain example embodiments, once the communication engine 306 allows the client 170 to have control over one or more network devices 140, the communication engine 306 can generate and send subsequent signals. Such signals can be based on input from a user 350, logic rules 342, a response from the server 110, and/or some other factor. The communication engine 306 can also include a counter and/or a timer to track, for example, a number of communications or an amount of time between events (e.g., communications).

The control exercised over particular network devices 140 by a client 170 can be complete (i.e., the server 110 or any other component of the mass notification system 100 cannot simultaneously control those network devices 140) or partial (e.g., the server 110 can instruct a network device 140 to perform a task while the network device 140 is under control of the client 170).

Continuing with FIGS. 1-3, the hardware processor 320 within the client 170 executes software in accordance with one or more example embodiments. Specifically, the hardware processor 320 can execute software on the client 170 or any of the engines and repositories described above and shown in FIG. 3, as well as software used by the user 350, the server 110, and/or one or more network devices 140. The hardware processor 320 can be an integrated circuit, a central processing unit, a multi-core processing chip, a multi-chip module including multiple multi-core processing chips, or other hardware processor in one or more example embodiments. The hardware processor 320 is known by other names, including but not limited to a computer processor, a microprocessor, and a multi-core processor. In one or more example embodiments, the hardware processor 320 executes software instructions stored in memory 322. The memory 322 includes one or more cache memories, main memory, and/or any other suitable type of memory. The memory 322 is discretely located on the client 170 relative to the hardware processor 320 according to some example embodiments. In certain configurations, the memory 322 also is integrated with the hardware processor 320.

Optionally, in one or more example embodiments, the security module 328 secures interactions between the client 170, the user 350, the server 110, and/or the network devices 140. More specifically, the security module 328 authenticates communication from software based on security keys verifying the identity of the source of the communication. For example, user software may be associated with a security key enabling the user software of the user 350 to interact with the client 170, the server 110, and/or the network devices 140. Further, the security module 328 restricts receipt of information, requests for information, and/or access to information in some example embodiments.

The user software can interact with the client 170, the server 110, and/or the network devices 140 using a browser extension. In this case, the browser extension maintains an active session with the client 170, the server 110, and/or the network devices 140 after the security module 328 has authenticated the user software. For example, the browser extension can continue to interact with the client 170 as the user 350 views various web content in the user software. In this example, the browser extension receives notifications from the client 170 for presenting to the user 350.

As discussed above, the user 350, the client 170, the server 110, and network devices 140 can use their own system or share a system in certain example embodiments. Such a system can be, or contain a form of, an Internet-based or an intranet-based computer system that is capable of communicating with various software. A computer system includes any type of computing device and/or communication device, including but not limited to the client 170. Examples of such a system can include, but are not limited to, a desktop computer with Internet or intranet access, a laptop computer with Internet or intranet access, a smart phone, a server, a server farm, and a personal digital assistant (PDA). Such a system can correspond to a computer system as described below with regard to FIG. 5.

Further, as discussed above, such a system can have corresponding software (e.g., user software, client software, server software, network device software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., network 120, Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the mass notification system 100.

In certain example embodiments, the client 170 does not include a hardware processor 320. In such a case, the client 170 can include, as an example, one or more field programmable gate arrays (FPGA). Using FPGAs and/or other similar devices known in the art allows the client 170 to be programmable and function according to certain logic rules 332 and thresholds without the use of a hardware processor.

In certain example embodiments, the server 110 has many of the components (e.g., hardware processor, application interface, security module, memory, communication application, storage repository) as listed above for the client 170. In the case of the server 110, certain communications received from the client 170 and/or certain logic rules 342 allow the client 170 to override the server 110 to control one or more of the network devices 140. Similarly, certain other communications received from the client 170 and/or certain other logic rules 342 allow the server 110 to resume control over one or more of the network devices 140.

Figure 4:
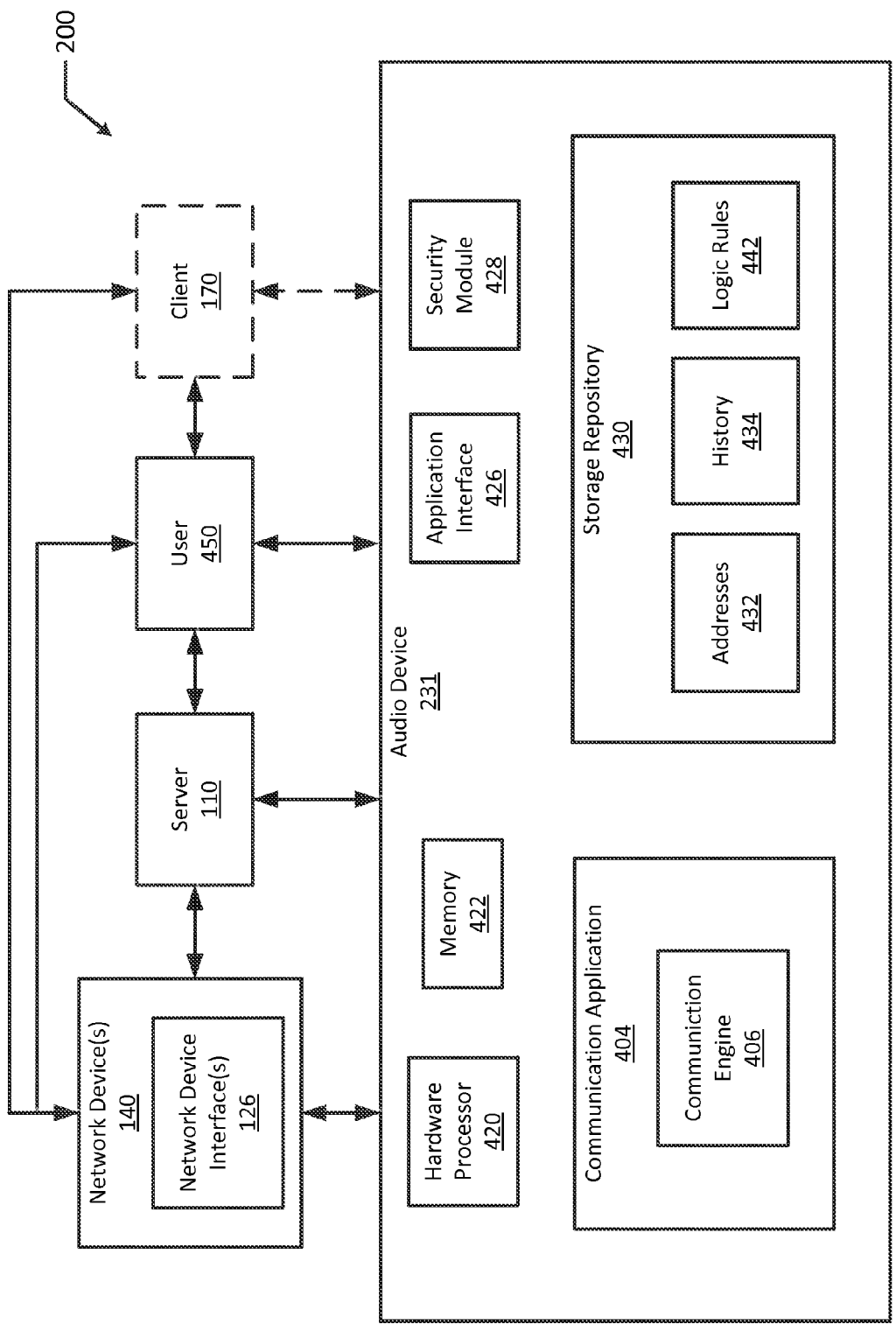
FIG. 4 shows a diagram of the mass notification system of FIG. 2 in accordance with one or more example embodiments.

FIG. 4 shows a diagram of the mass notification system 200 of FIG. 2 in accordance with one or more example embodiments. The components of the mass notification system 200 of FIG. 4 can be substantially similar to the components of the mass notification system 100 of FIG. 3, except as described below. In certain example embodiments, the client 170 is optional. If used, the client 170 is substantially the same as the client 170 of FIG. 3 above and can be communicably coupled to the user 350, the server 211, the audio device 231, and one or more network devices 140. In such a case, the client can be communicably coupled using the communication network.

Similarly, in certain example embodiments, the audio device 231 of FIG. 4 includes components that are substantially similar to the components of the client 170 described above with respect to FIG. 3, except as described below. Specifically, the description for any component (e.g., hardware processor 420, communication application 404, storage repository 430) of FIG. 4 not provided below can be considered substantially the same as the corresponding component (e.g., hardware processor 320, communication application 304, storage repository 330) described above with respect to FIG. 3. The numbering scheme for the components of FIG. 4 parallels the numbering scheme for the components of FIG. 3 in that each component is a three digit number, where similar components between the mass notification system 200 of FIG. 4 and the mass notification system 100 of FIG. 3 have the identical last two digits.

The audio device 231 can select the one or more network devices 140 that are to be controlled by (receive the audio output of) the audio device 231. In such a case, the selection of the network devices 140 to be controlled by the audio device 231 can be done in one or more of a number of ways. For example, the selection of the network devices 140 to be controlled by the audio device 231 can be done by a user 350 using the application interface 426 of the audio device 231. Alternatively, the selection of the network devices 140 to be controlled by the audio device 231 can be done by logic rules 442 (e.g., based on the node of the communication network to which the audio device 231 is communicably coupled, based on the address 432 of the audio device 231).

As yet another alternative, the selection of the network devices 231 to be controlled by the audio device 231 can be done by the server 110. In such a case, the server 110 can send an instruction to the particular network devices 140 to be controlled by the audio device 231 so that those network devices 140 follow the communications received from the audio device 231. In some cases, when the server 110 sends an instruction to particular network devices 140 to be controlled by the audio device 231, the server 110 can also send the instruction to one or more other network devices 140 to perform a task. For example, the server 110 can send a communication to a number of speaker stations (forms of network devices 140) to transfer control of those speaker stations to the audio device 231. In addition, the communication can also be sent by the server 110 to a control panel, another network device 140, to display that the audio device 231 is communicably coupled to the mass notification system 200.

The audio device 231 can also generate audio (e.g., live audio feed, recorded audio) or some other form of communication. In addition, the audio device 231 can send the audio or other form of communication to the network devices 140 controlled by the audio device 231. In such a case, the audio device 231 can be used to selectively broadcast notification information to network devices 140 within the mass notification system 200.

In certain example embodiments, the audio device 231 can be communicably coupled to a client 170. In such a case, the client 170 can be used to override the control of one or more network devices 140 by the server 110 in favor of the audio device 231. As described above, the client 170 can override the server 110 in favor of the audio device 231 in one or more of a number ways, including but not limited to by a user 350 interacting with the application interface 326 and by logic rules 332.

The control exercised over particular network devices 140 by the audio device 231 can be complete (i.e., the server 110, a client 170, or any other component of the mass notification system 200 cannot simultaneously control those network devices 140) or partial (e.g., the server 110 can instruct a network device 140 to perform a task while the network device 140 is under control of the audio device 231).

In certain example embodiments, the audio device 231 does not include a hardware processor 420. In such a case, the audio device 231 can include, as an example, one or more field programmable gate arrays (FPGA). Using FPGAs and/or other similar devices known in the art allows the audio device 231 to be programmable and function according to certain logic rules 432 and thresholds without the use of a hardware processor.

Figure 5:
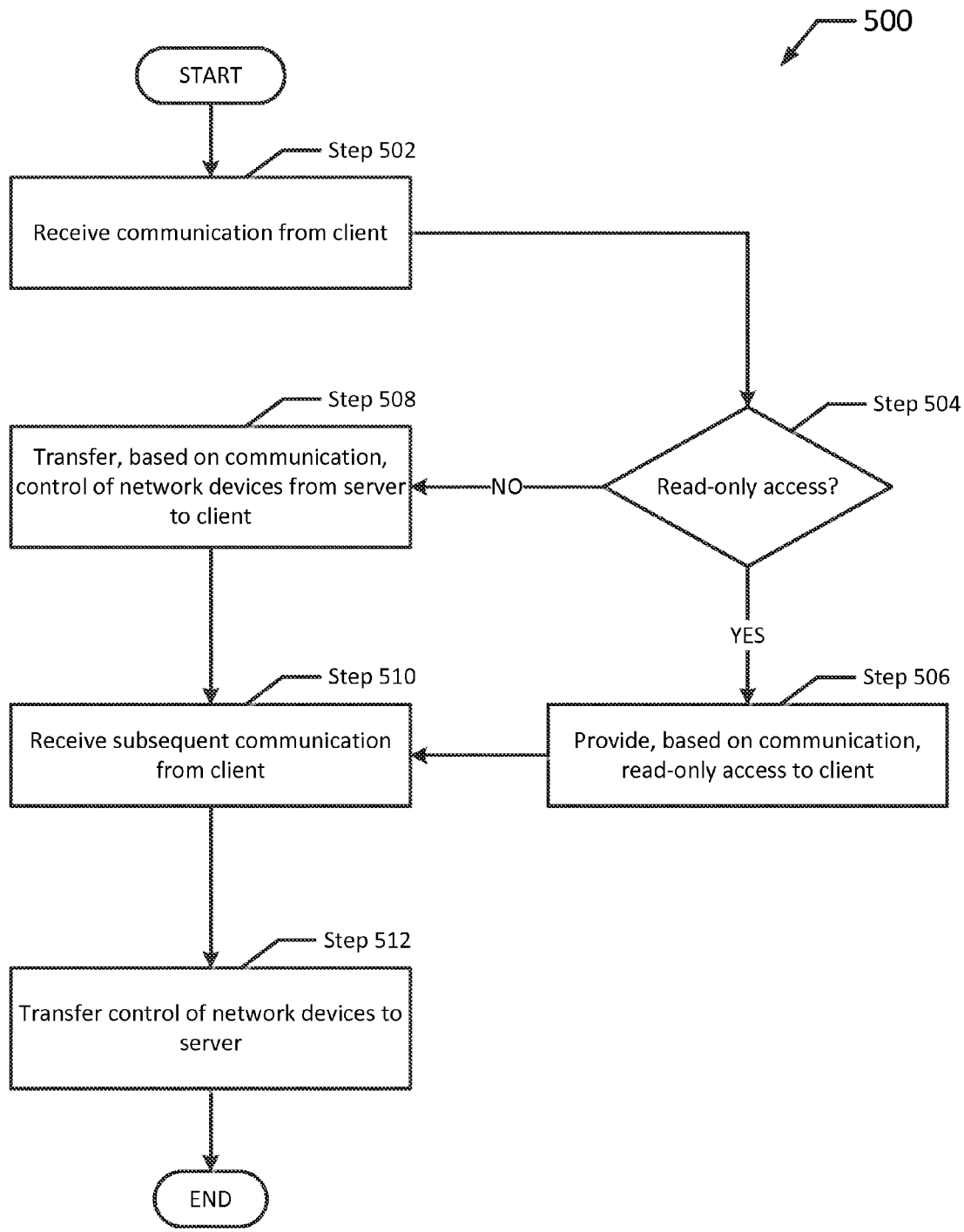
FIG. 5 shows a flowchart of a method in accordance with one or more example embodiments.

FIG. 5 is a flow chart presenting a method 500 for controlling a mass notification system 100 in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 5 may be included in performing this method. Accordingly, the specific arrangement of steps should not be construed as limiting the scope. Further, a particular computing device, as described, for example, in FIG. 7 below, can be used to perform one or more of the steps for the method 500 described below in certain exemplary embodiments.

Referring now to FIGS. 1-5, the example method 500 begins at the START step and proceeds to step 502, where a communication is received from a client 170. The communication can be sent to the server 110 and/or one or more network devices 140. The communication can be generated and sent by the control device 210 (or, more specifically, the communication engine 306 of the control device 210). The communication can be sent using the communication network of the mass notification system 100. The communication can include a unique target address 332 for the server 110 and/or each network device 140 to which the communication is intended. In step 504, a determination is made as to whether the client 170 has read-only access. The determination can be made by the server 110. In certain example embodiments, the determination is made based on the communication in step 502. Alternatively, the determination is made based on logic rules. If the client 170 has read-only access, the process proceeds to step 506. If the client 170 does not have read-only access (i.e., the client 170 can command and control the server 110 and/or one or more network devices 140), the process proceeds to step 508.

In step 506, read-only access is provided to the client 170. The read-only access can be provided by the server 110. The read-only access can be provided to the client 170 based on the communication of step 502. With read-only access, the client 170 can perform such passive actions as monitoring the status of one or more network devices 140, running reports based on the performance of one or more network devices, and tracking activity of the server 110. However, the read-only access prohibits the client 170 from controlling any network devices 140 and/or overriding the server 110. Once read-only access is provided to the client 170, the process proceeds to step 510.

In step 508, control of one or more network devices 140 is transferred to the client 170. Control of the network devices 140 can be transferred to the client 170 by the server 110. By having control of a network device 140, the client 170 can not only perform the passive functions listed above with respect to step 506, but the client 170 can also actively control the operating status (e.g., turn on/off, adjust volume, deliver audio output, set alarm) of the network device 140. The control of the network device 140 by the client 170 can be complete or shared in some way with the server 110.

In step 510, a subsequent communication is received from the client 170. The subsequent communication can be a new communication compared to the communication of step 502. Alternatively, the subsequent communication can be a stop in a communication from the client 170, as when the client 170 is powered down or is disconnected from the communication network. In certain example embodiments, this step 510 is optional.

In step 512, control of the network devices 140 is transferred from the client 170. Control of the network devices 140 is transferred from the client 170 by the server 110. Control of the network devices 140 can be transferred from the client 170 to another client 170, to the server 110, to an audio device 231, or to some other component of the mass notification system 100. Control of the network devices 140 can be transferred based on the subsequent communication from step 510. Alternatively, control of the network devices 140 can be transferred based on one or more other factors, including but not limited to logic rules 332, input from a user 350, and the passage of time. After step 512 is complete, the process can proceed to the END step.

Figure 6:
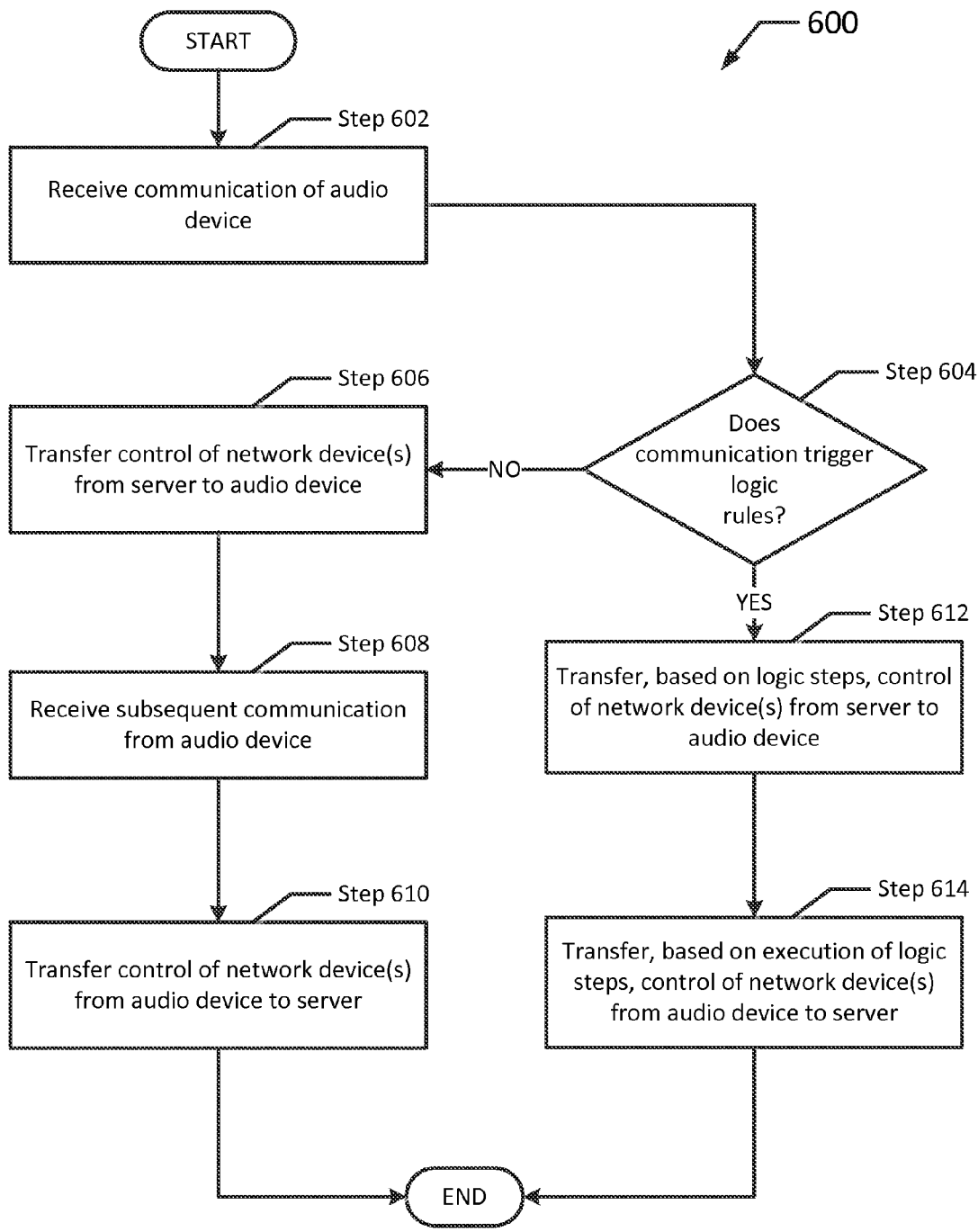
FIG. 6 shows a flowchart of another method in accordance with one or more example embodiments.

FIG. 6 is a flow chart presenting a method 600 for controlling a mass notification system 200 in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 6 may be included in performing this method. Accordingly, the specific arrangement of steps should not be construed as limiting the scope. Further, a particular computing device, as described, for example, in FIG. 7 below, can be used to perform one or more of the steps for the method 600 described below in certain exemplary embodiments.

Referring now to FIGS. 1-6, the example method 600 begins at the START step and proceeds to step 602, where a communication is received from an audio device 231. The communication can be a signal of connection of the audio device 231 to the communication network of the mass notification network 200. Alternatively, the communication can be something generated and sent by the audio device 231. The communication can be received by the server 110 and/or a client 170. The communication can be a request, a notification, a confirmation of connection to the communication network, or have any other purpose.

In step 604, a determination is made as to whether logic rules 432 are triggered by the communication. In certain example embodiments, the determination is made based on one or more particulars (e.g., the content, the timing, the recipient) of the communication in step 602. The determination can be made by the server 110, a client 170, a user 350, or some other component of the mass notification system 200. If logic rules 432 apply, the process proceeds to step 612. If logic rules 432 do not apply, the process proceeds to step 606.

In step 606, control of one or more network devices 140 is transferred to the audio device 231. Control of the network devices 140 can be transferred to the audio device 231 can be based on something other than logic rules 432, such as a command from a user 350 or a client 170. Control of the network devices 140 can be transferred to the audio device 231 by the server 110, a user 350, and/or a client 170. By having control of a network device 140, the audio device 231 can actively control the operating status (e.g., turn on/off, adjust volume, deliver audio output) of the network device 140. The control of the network device 140 by the audio device 231 can be complete or shared in some way with the server 110, a client 170, or some other component of the mass notification system 200.

In step 608, a subsequent communication is received from the audio device 231. The subsequent communication can be a new communication compared to the communication of step 602. Alternatively, the subsequent communication can be a stop in a communication from the audio device 231, as when the audio device 231 is powered down or is disconnected from the communication network. In certain example embodiments, this step 608 is optional.

In step 610, control of the network devices 140 is transferred from the audio device 231. Control of the network devices 140 is transferred from the audio device 231 by the server 110. Control of the network devices 140 can be transferred from the audio device 231 to a client 170, to the server 110, or to some other component of the mass notification system 200. Control of the network devices 140 can be transferred based on the subsequent communication from step 608. Alternatively, control of the network devices 140 can be transferred based on one or more other factors, including but not limited to input from a user 350 and the passage of time. After step 610 is complete, the process can proceed to the END step.

In step 612, control of one or more network devices 140 is transferred to the audio device 231. Control of the network devices 140 can be transferred to the audio device 231 can be based on one or more logic rules 432. Control of the network devices 140 can be transferred to the audio device 231 by the server 110, a user 350, and/or a client 170. By having control of a network device 140, the audio device 231 can actively control the operating status (e.g., turn on/off, adjust volume, deliver audio output) of the network device 140. The control of the network device 140 by the audio device 231 can be complete or shared in some way with the server 110, a client 170, or some other component of the mass notification system 200.

In step 614, control of the network devices 140 is transferred from the audio device 231. Control of the network devices 140 is transferred from the audio device 231 by the server 110. Control of the network devices 140 can be transferred from the audio device 231 to a client 170, to the server 110, or to some other component of the mass notification system 200. Control of the network devices 140 can be transferred based on the logic rules 432. After step 614 is complete, the process can proceed to the END step.

Figure 7:
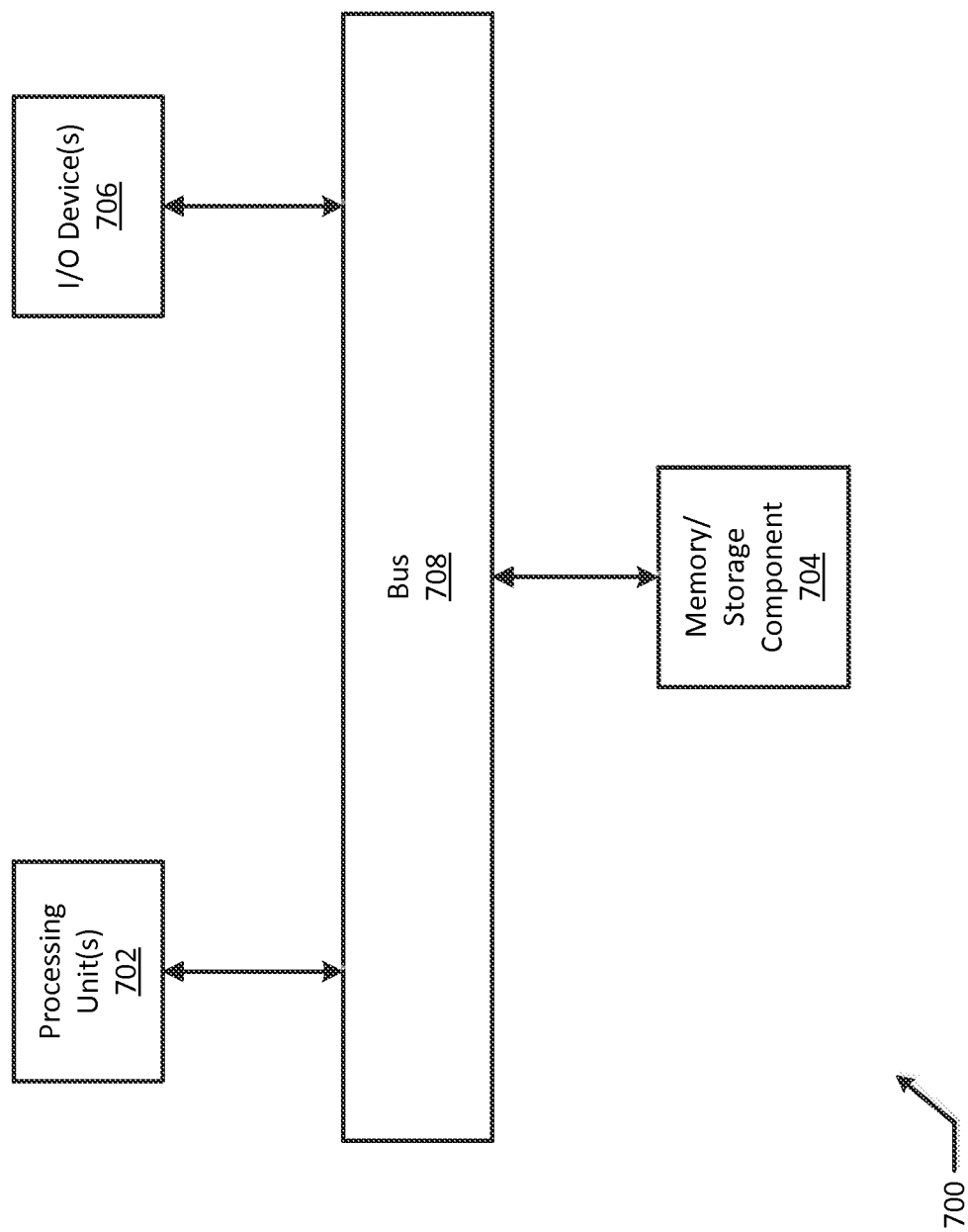
FIG. 7 shows a computing device in accordance with one or more example embodiments.

FIG. 7 illustrates one embodiment of a computing device 700 that implements one or more of the various techniques described herein, and which is representative, in whole or in part, of the elements described herein pursuant to certain exemplary embodiments. Computing device 700 is one example of a computing device and is not intended to suggest any limitation as to scope of use or functionality of the computing device and/or its possible architectures. Neither should computing device 700 be interpreted as having any dependency or requirement relating to any one or combination of components illustrated in the example computing device 700.

Computing device 700 includes one or more processors or processing units 702, one or more memory/storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 includes wired and/or wireless buses.

Memory/storage component 704 represents one or more computer storage media. Memory/storage component 704 includes volatile media (such as random access memory (RAM)) and/or nonvolatile media (such as read only memory (ROM), flash memory, optical disks, magnetic disks, and so forth). Memory/storage component 704 includes fixed media (e.g., RAM, ROM, a fixed hard drive, etc.) as well as removable media (e.g., a Flash memory drive, a removable hard drive, an optical disk, and so forth).

One or more I/O devices 706 allow a customer, utility, or other user to enter commands and information to computing device 700, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 700 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 700 includes at least the minimal processing, input, and/or output means necessary to practice one or more embodiments.

Further, those skilled in the art will appreciate that one or more elements of the aforementioned computer device 700 is located at a remote location and connected to the other elements over a network in certain exemplary embodiments. Further, one or more embodiments is implemented on a distributed system having one or more nodes, where each portion of the implementation (e.g., communication engine 306, communication engine 406) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Using example embodiments of mass notification systems described herein allows a user, an audio device, and/or a client to access information, in real time, about one or more network devices within the mass notification system. This information can be used during steady state operation of one or more network devices and/or when the state of one or more network devices changes. Existing equipment (e.g., network, communication channels) needed to communicate with network devices can be used, so additional resources needed to use example embodiments are minimal.

Installation or alteration of a client and/or an audio device (and its corresponding functionality as described herein) may also be minimal. Specifically, a client and/or an audio device can be communicably coupled to any node in the communication network of the mass notification system, and an addition to existing operating parameters and/or change in software/logic rules can be installed. Communicably coupling a client and/or an audio device can be performed seamlessly, often using wireless or a minimal amount of wired technology. Example embodiments are more efficient and flexible than existing mass notification systems. Costs of installing, replacing, modifying, and/or maintaining a mass notification system using example embodiments is reduced. Thus, labor costs can also be reduced using example embodiments.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A mass notification system, comprising:
    a communication network;
    a plurality of network devices comprising a first network device and a second network device, wherein the plurality of network devices are communicably coupled to the communication network, wherein the first network device is configured to generate a first notification, and wherein the second network device is configured to generate a second notification substantially simultaneously when the first notification is generated by the first network device;
    a server communicably coupled to the communication network and configured to control the plurality of network devices, wherein the server instructs the first network device to generate the first notification and the second network device to generate the second notification; and
    a first client communicably coupled to the communication network and comprising a user interface, wherein the first client is configured to communicate, via the user interface, with the server and the plurality of network devices,
    wherein the first client is connected to a first node of the communication network at a first time, and wherein the first client is connected to a second node of the communication network at a second time.

2. The system of claim 1, wherein the first client is further configured to control the plurality of network devices, wherein the first client overrides the server to control the plurality of network devices when the first client sends a first instruction to at least one of the plurality of network devices using the communication network.

3. The system of claim 1, wherein the first client is a read-only device.

4. The system of claim 1, wherein the first client uses a web browser.

5. The system of claim 1, wherein the first client is configured to control the server.

6. The system of claim 1, further comprising:
    a second client communicably coupled to the communication network and configured to control the plurality of network devices,
    wherein the second client overrides the server to control the plurality of network devices when the second command center sends a second instruction to at least one of the plurality of network devices using the communication network.

7. The system of claim 6, wherein the first instruction and the second instruction are prioritized with respect to each other using at least one logic rule.

8. The system of claim 1, wherein the first client is one of the plurality of network devices.

9. The system of claim 1, wherein the plurality of network devices comprises an audio device, wherein the audio device is a source of audio for at least one other network device of the plurality of network devices.

10. The system of claim 9, wherein the audio device is connected to a first node of the communication network at a first time, and wherein the audio device is connected to a second node of the communication network at a second time.

11. A mass notification system, comprising:
    a communication network;
    a plurality of network devices comprising a first network device and a second network device, wherein the plurality of network devices are communicably coupled to the communication network, wherein the first network device is configured to generate a first notification, and wherein the second network device is configured to generate a second notification substantially simultaneously when the first notification is generated by the first network device, wherein the first network device and the second network device comprise an audio device; and
    a server communicably coupled to the communication network and configured to control the plurality of network devices, wherein the audio device is a source of audio for a remainder of the plurality of network devices, wherein the source of audio generated by the audio device and delivered to the remainder of the plurality of network devices overrides the server, wherein the audio device is connected to a first node of the communication network at a first time, and wherein the audio device is connected to a second node of the communication network at a second time.

12. The system of claim 11, wherein the remainder of the first network device and the second network device is selectable using the audio device.

13. The system of claim 11, wherein the remainder of the first network device and the second network device is selectable using the server.

14. The system of claim 11, wherein the audio device comprises:
- a hardware processor; and
- a communication engine executing instructions on the hardware processor and configured to:
  - control the remainder of the first network device and the second network device;
  - generate audio; and
  - send the audio to the remainder of the first network device and the second network device.

15. The system of claim 11, wherein the audio device overrides the server based on an instruction from the server to the first network device and the second network device.

16. The system of claim 15, wherein the instruction further instructs at least one network device, aside from the first network device and the second network device, to perform a task.

17. The system of claim 11, wherein the audio device is communicably coupled to a client, wherein the client is communicably coupled to the communication network and is configured to communicate, via the user interface, with the server and the plurality of network devices.

18. A method for controlling a mass notification system, comprising:

receiving a communication from a client communicably coupled to the mass notification system, wherein the mass notification system is controlled by a server;

transferring, in response to the communication, control of the notification system to the client, wherein the mass notification system comprises a plurality of network devices, wherein the plurality of network devices comprises a first network device and a second network device, wherein the first network device is configured to generate a first notification, and wherein the second network device is configured to generate a second notification substantially simultaneously when the first notification is generated by the first network device, wherein the first notification and the second notification are generated based on a subsequent communication from the client, wherein the client is connected to a first node of the mass notification system at a first time, and wherein the client is connected to a second node of the mass notification system at a second time.

\* \* \* \* \*